(12) United States Patent
Wohlmuth et al.

(10) Patent No.: US 10,271,004 B2
(45) Date of Patent: Apr. 23, 2019

(54) MOTORIZED ROLLER TELEVISION COVER ASSEMBLY

(71) Applicant: Phyllis M Wohlmuth, West Palm Beach, FL (US)

(72) Inventors: Howard Wohlmuth, Pikesville, MD (US); Louis Wohlmuth, Pikesville, MD (US); Martin Hal Wohlmuth, Baltimore, MD (US)

( * ) Notice: Subject to any disclaimer, the term of this patent is extended or adjusted under 35 U.S.C. 154(b) by 0 days.

(21) Appl. No.: 15/997,370

(22) Filed: Jun. 4, 2018

(65) Prior Publication Data

US 2018/0352188 A1    Dec. 6, 2018

Related U.S. Application Data

(60) Provisional application No. 62/515,356, filed on Jun. 5, 2017.

(51) Int. Cl.
| | |
|---|---|
| *E06B 9/72* | (2006.01) |
| *H04N 5/64* | (2006.01) |
| *F16M 13/02* | (2006.01) |
| *B65H 75/44* | (2006.01) |
| *E06B 9/42* | (2006.01) |
| *E06B 9/44* | (2006.01) |

(52) U.S. Cl.
CPC ............. *H04N 5/64* (2013.01); *B65H 75/446* (2013.01); *B65H 75/4486* (2013.01); *E06B 9/42* (2013.01); *E06B 9/44* (2013.01); *E06B 9/72* (2013.01); *F16M 13/02* (2013.01)

(58) Field of Classification Search
CPC ..... E06B 9/42; E06B 9/40; E06B 9/50; E06B 9/72; E06B 9/44; A47H 1/13; Y10T 403/32549; Y10T 403/32557; Y10T 403/32565
USPC ................. 248/266, 918, 269; 348/836–843; 403/113, 114, 142
See application file for complete search history.

(56) References Cited

U.S. PATENT DOCUMENTS

| | | | | |
|---|---|---|---|---|
| 1,471,534 | A * | 10/1923 | Smythe ..................... | E06B 9/54 160/11 |
| 6,715,526 | B1 * | 4/2004 | Brownfield ............ | A47H 13/00 160/24 |
| 6,738,094 | B1 * | 5/2004 | Minami ............... | H04N 5/2251 248/166 |
| 8,203,658 | B2 * | 6/2012 | Wang ................... | H05K 5/0017 242/598.3 |
| 8,302,335 | B2 * | 11/2012 | Wang ..................... | G09F 11/29 160/319 |

(Continued)

*Primary Examiner* — Katherine W Mitchell
*Assistant Examiner* — Jeremy C Ramsey

(57) ABSTRACT

A motorized roller television cover conceals a television set when the television is not in use. The motorized roller television cover utilizes a first mounting bracket, a second mounting bracket, a roller, an aesthetic sheet, and a motor to create a more aesthetically appealing atmosphere than leaving the television set exposed. The first mounting bracket and the second mounting bracket support the roller, the motor, and the aesthetic sheet on a television set. The motor actuates the rotation of the roller to extend or retract the aesthetic sheet to display the aesthetic sheet or expose the television set. The roller is able to be quickly installed onto or removed from the first mounting bracket and the second mounting bracket to replace or interchange the aesthetic sheet in accordance to the user's preference.

16 Claims, 11 Drawing Sheets

(56) References Cited

U.S. PATENT DOCUMENTS

| | | | | |
|---|---|---|---|---|
| 8,967,568 B2* | 3/2015 | Wills | ..................... | E06B 9/50 |
| | | | | 160/323.1 |
| 2011/0229254 A1* | 9/2011 | Su | ..................... | F16D 3/2052 |
| | | | | 403/114 |
| 2015/0252614 A1* | 9/2015 | Diamond | ................ | E06B 9/44 |
| | | | | 160/108 |
| 2017/0096855 A1* | 4/2017 | Chen | ..................... | E06B 9/42 |

* cited by examiner

MOTORIZED ROLLER TELEVISION COVER ASSEMBLY

The current application claims a priority to the U.S. Provisional Patent application Ser. No. 62/515,356 filed on Jun. 5, 2017.

FIELD OF THE INVENTION

The present invention relates generally to a motorized roller assembly used to cover a television screen with artwork when the television is not in use. More specifically, the present invention utilizes a pair of mounting brackets to secure the present invention onto a plurality of televisions with differing dimensions.

BACKGROUND OF THE INVENTION

In recent years, a plurality of homes and businesses in the United States have one or more flat-screen television sets. These television sets are utilized for entertainment; however, when the television set is not being used, a black screen takes the place of any media previously displayed. While the screen is off, the black screen leaves an aesthetic void in the room that the television set is located.

There are many television set cover ups, to disguise the television set, currently available; however, the present invention is unique because the present invention provides a retractable printed picture mounted on the top and back of the television set. Currently, the television set cover ups available include a ceiling mounted maps, framed mirrors, framed pictures, sliding doors, and hinged doors. The prices for these television set cover ups range between the hundreds and thousands of dollars.

An objective of the present invention is to provide an inexpensive, flexible alternative to covering the television set while the television set is not in use. The present invention utilizes a remote-controlled, motorized shade attached to the television set that displays aesthetic sheets, such as artwork, photographs or other images superimposed onto a sheet, while the television set is turned off. The user initiates the sequence to extend or retract aesthetic sheet with a touch of a button when the user is ready to watch television set. The present invention is mounted onto the top and back of a television, such that the present invention is almost completely concealed from the view of the user, with only the top edge of the aesthetic sheet mounted to a roller being visible. A first mounting bracket and a second mounting bracket are designed to universally fit any television regardless of shape, size, or mounting on a pedestal or on a wall. The motor and electronics are installed inside the roller that supports the aesthetic sheet. The aesthetic sheet is secured to the roller using fasteners such as snaps, hooks, clamps, etc., so the user can easily interchange the aesthetic sheet with another. The extension and retraction process of the aesthetic sheet is controlled by a wireless device, such as a remote control, a current sensor, the user's cell phone or through a wireless protocol such as Bluetooth or Wi-Fi. The image for the aesthetic sheet is printed selected in accordance to the preference of the user or provided by the user.

DETAIL DESCRIPTIONS OF THE INVENTION

Figure 1:
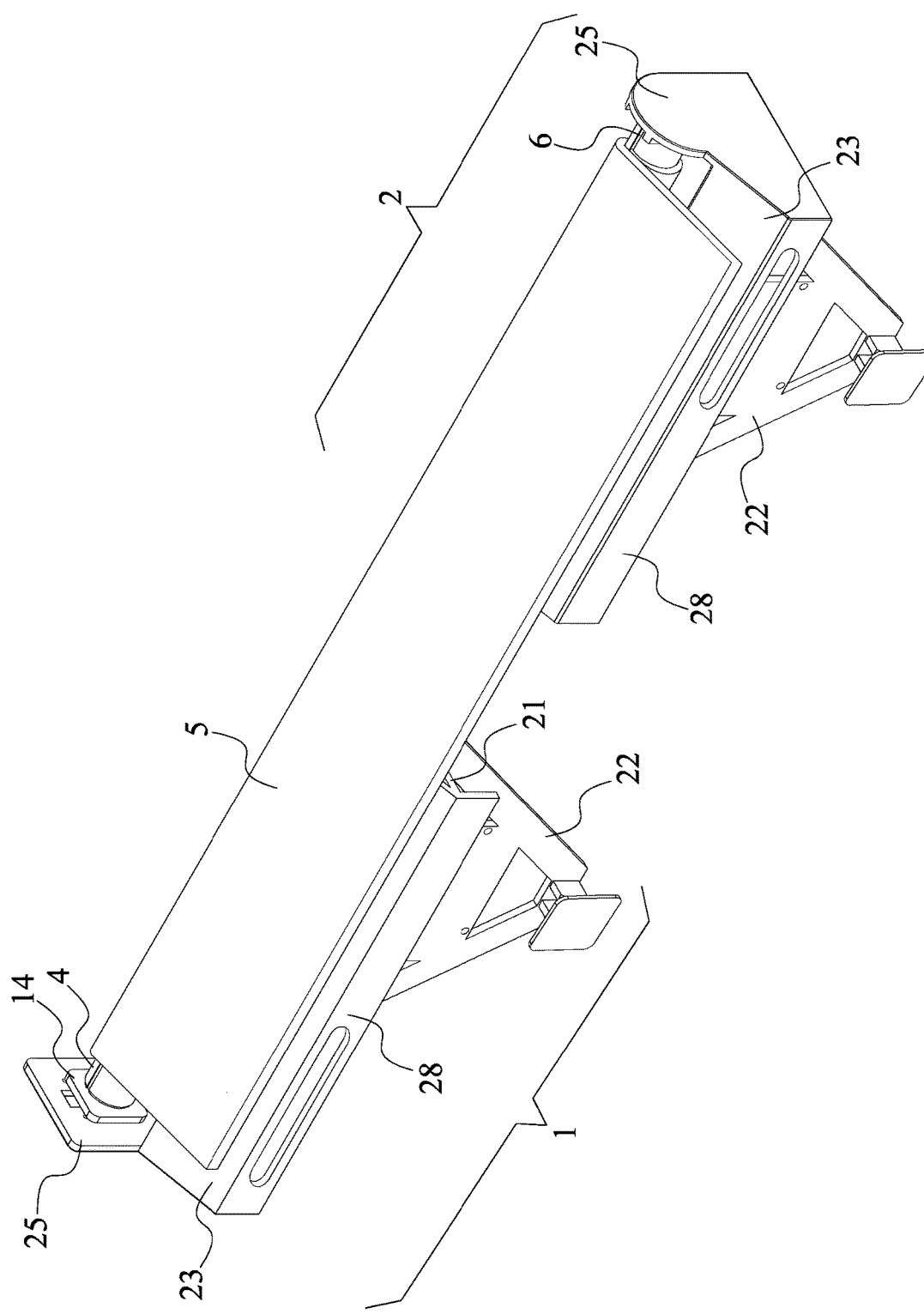
FIG. 1 is a perspective view of the present invention.
Figure 2:
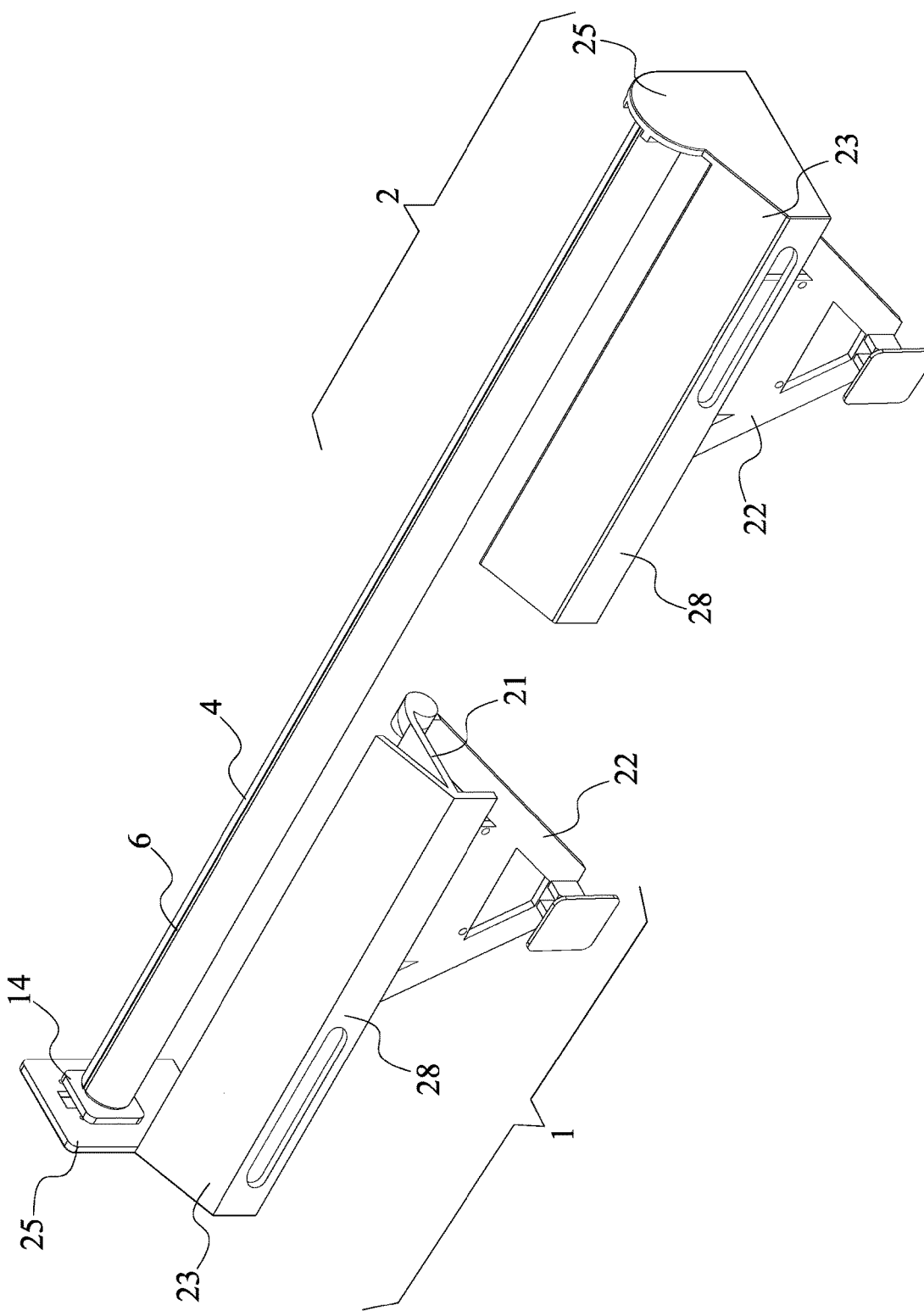
FIG. 2 is a perspective view of the present invention, wherein an aesthetic sheet is removed.

All illustrations of the drawings are for the purpose of describing selected versions of the present invention and are not intended to limit the scope of the present invention.

The present invention is a motorized roller television cover assembly. The present invention is mounted on top of a flat-screen television set to provide a retractable cover that conceals a television set from view when the television set is not being utilized. The present invention allows a user to display artwork, photos, or other images to cover the television set, when the television set is not in use. The user is able to quickly spool the displayed imagery to reveal the television set when the user prefers to view the television set.

The present invention comprises a first mounting bracket 1, a second mounting bracket 2, a motor 3, a roller 4, and an aesthetic sheet 5. The first mounting bracket 1 and the second mounting bracket 2 support the present invention on a television set. The roller 4 supports the aesthetic sheet 5 and facilitates the spooling or unspooling of the aesthetic sheet 5 around the roller 4 to cover the television set or allow the television set to be viewed. The aesthetic sheet 5 is a flexible sheet that includes, but is not limited to, photographs, paintings, drawings, digital imagery, or other imagery that are superimposed onto the flexible sheet for display. The motor 3 controls the rotation of the roller 4 to extend or retract the aesthetic sheet 5 to obscure or reveal the television set screen.

In accordance to FIG. 1 to FIG. 3, FIG. 4, and FIG. 5, the first mounting bracket 1 and the second mounting bracket 2 each comprise a top-mounting support 21, a rear-mounting support 22, and a roller-mounting panel 25. The top-mounting support 21 and the rear-mounting support 22 the present invention on the frame for the television set to mount the motor 3, the roller 4, and the aesthetic sheet 5 to the television set. In accordance to the preferred embodiment of the present invention, the rear-mounting support 22 is hingedly connected to the top-mounting support 21. The top-mounting support 21 rests on the top of the frame of the television set, while the rear-mounting support 22 is secured to the rear of the frame. The rear-mounting support 22 may be affixed to the television set through hook and loop fasteners, adhesives, or any other appropriate fastener to prevent the present invention from being dislodged from the television set during implementation. The weight of the present invention is supported by the frame of the television set.

Figure 4:
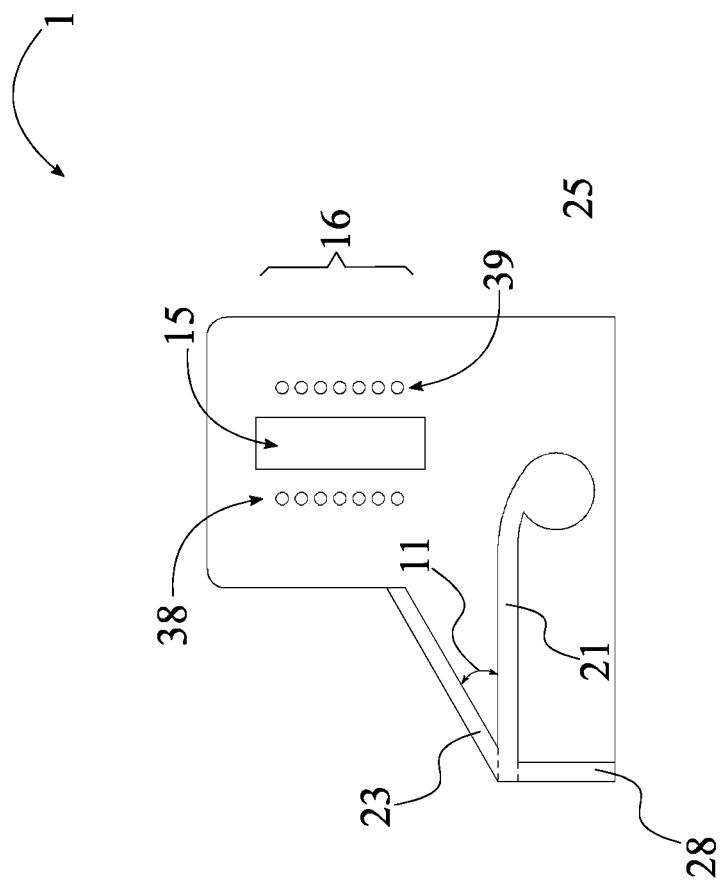
FIG. 4 is a right view for a first mounting bracket of the present invention, wherein the rear-supporting panel is removed.
Figure 5:
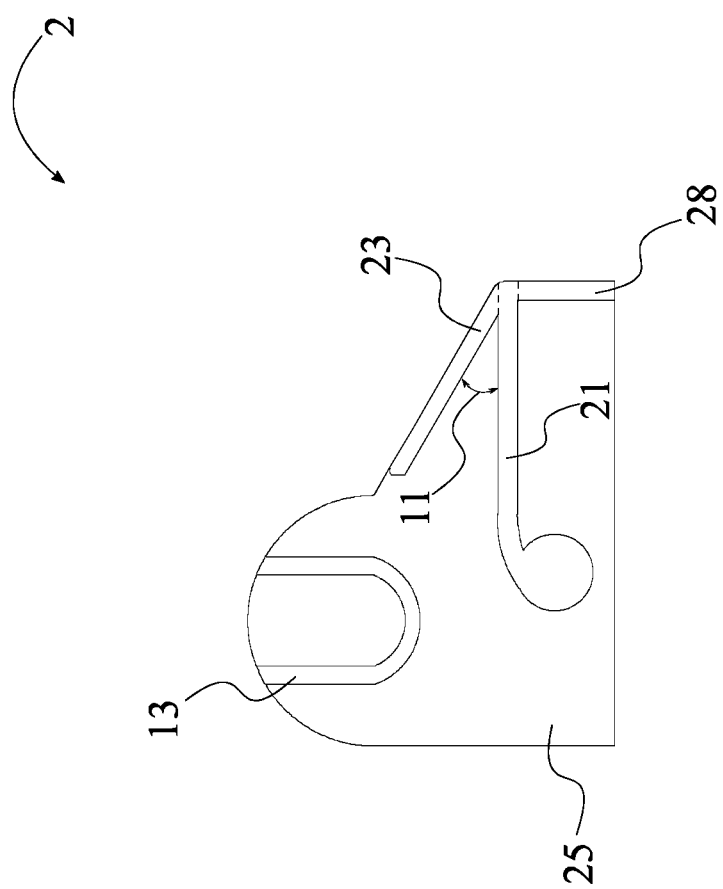
FIG. 5 is a left view for a second mounting bracket of the present invention, wherein the rear-supporting panel is removed.

In some embodiments of the present invention the present invention comprises a front-mounting support 28, shown in FIG. 1, FIG. 4, and FIG. 5. The front-mounting support 28 assists the top-mounting support 21 and the rear-mounting support 22 in securing the present invention to the frame of the television set. the front-mounting support 28 is perpendicularly connected along the top-mounting support 21. The front-mounting support 28 is oppositely positioned to the rear-mounting support 22 across the top-mounting support 21. The front-mounting support 28 is positioned adjacent to the front of the frame while the present invention is implemented, such that the frame is positioned between the front-mounting support 28, the top-mounting support 21, and the rear-mounting support 22.

Further in accordance to the preferred embodiment of the present invention, the first mounting bracket 1 and the second mounting bracket 2 each further comprise a sheet support 23. The sheet support 23 directs the aesthetic sheet 5 over the top of television set, detailed in FIG. 1 to FIG. 5. The sheet support 23 is connected to the top-mounting support 21. The sheet support 23 is adjacently positioned to the front-mounting support 28. The sheet support 23 is oriented away from the front-mounting support 28, such that the sheet support 23 is able to direct the aesthetic sheet 5 over the television set during implementation of the present invention. More specifically, the sheet support 23 is at an acute angle 11, detailed in FIG. 4 and FIG. 5, with the top-mounting support 21, in order to reduce friction between the mounting bracket and the aesthetic sheet 5 as the aesthetic sheet 5 translates over the mounting bracket. By reducing friction, damage to the aesthetic sheet 5 is reduced, extending the duration that the aesthetic sheet 5 is persevered.

Figure 3:
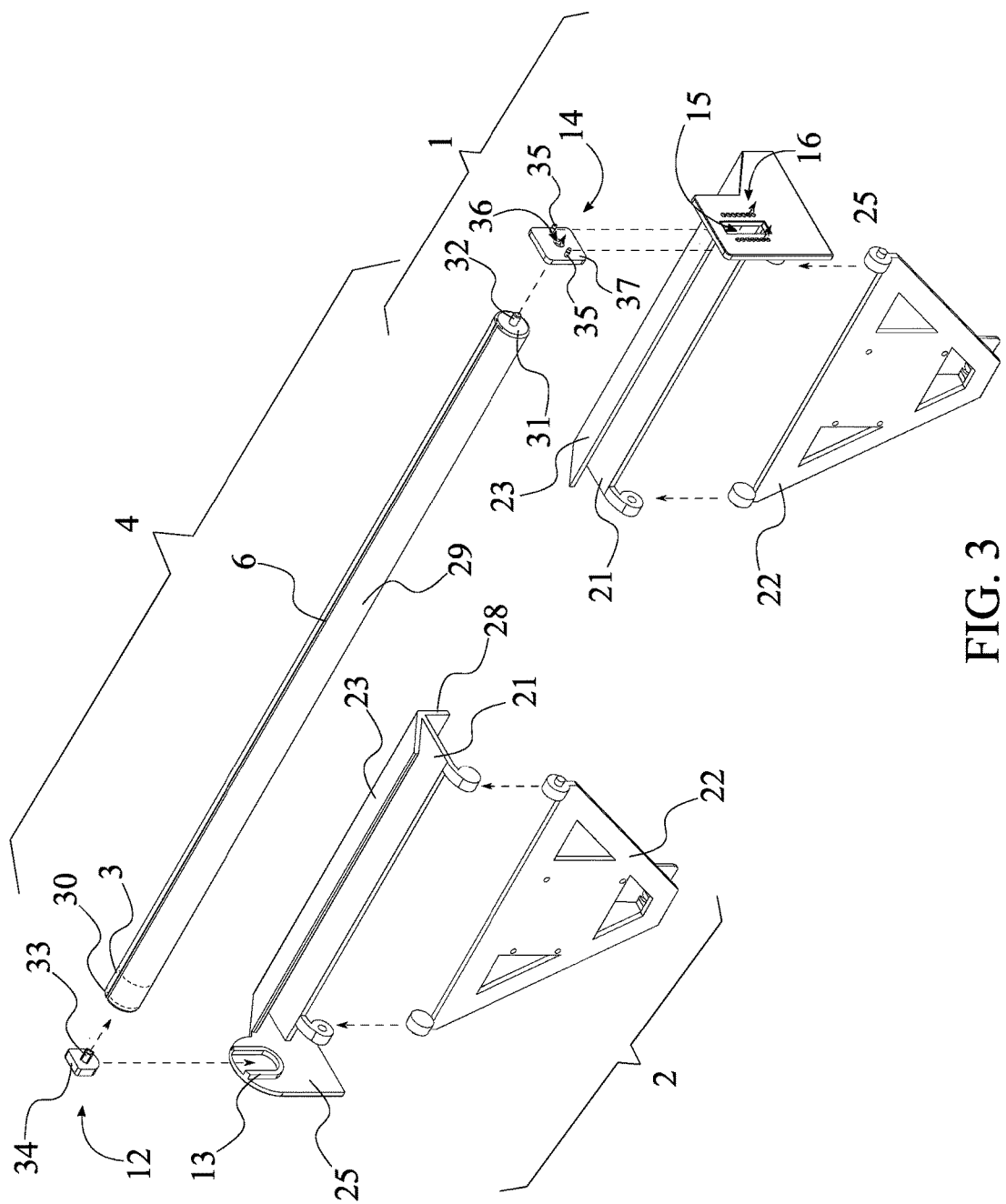
FIG. 3 is an exploded, rear perspective view of the present invention, wherein the aesthetic sheet is removed.

Still in accordance to the preferred embodiment of the present invention, the roller-mounting panel 25 provides a brace for mounting the roller 4, shown in FIG. 3. The roller-mounting panel 25 is terminally connected to the front-mounting support 28, the top-mounting support 21, and the sheet support 23. The roller-mounting panel 25 of the first mounting bracket 1 is oppositely positioned to the roller-mounting panel 25 of the second mounting bracket 2, along each top-mounting support 21. The roller-mounting panel 25 of the first mounting bracket 1 being similarly oriented to the roller-mounting panel 25 of the second mounting bracket 2 to allow the roller 4 to be positioned level between the first mounting bracket 1 and the second mounting bracket 2.

Figure 10:
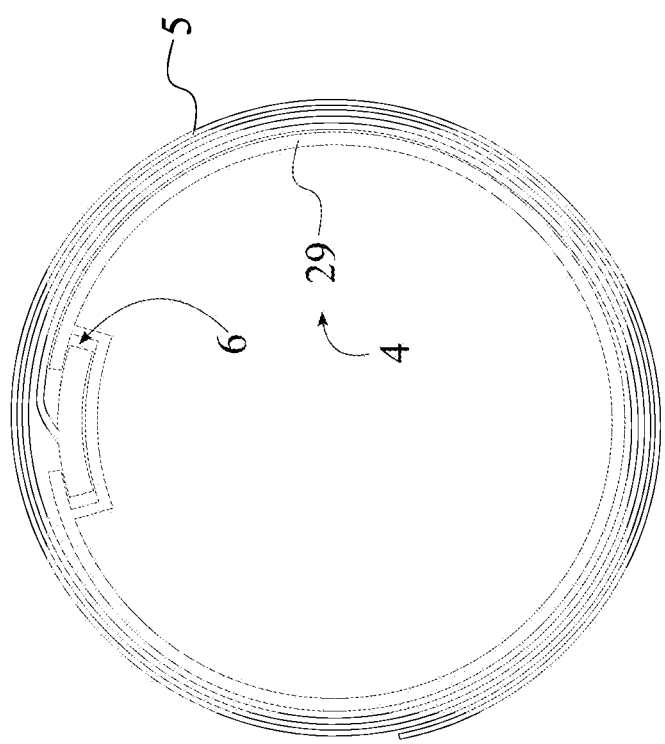
FIG. 10 is a cross-sectional view for a roller of the present invention, wherein the aesthetic sheet is spooled around the roller.
Figure 11:
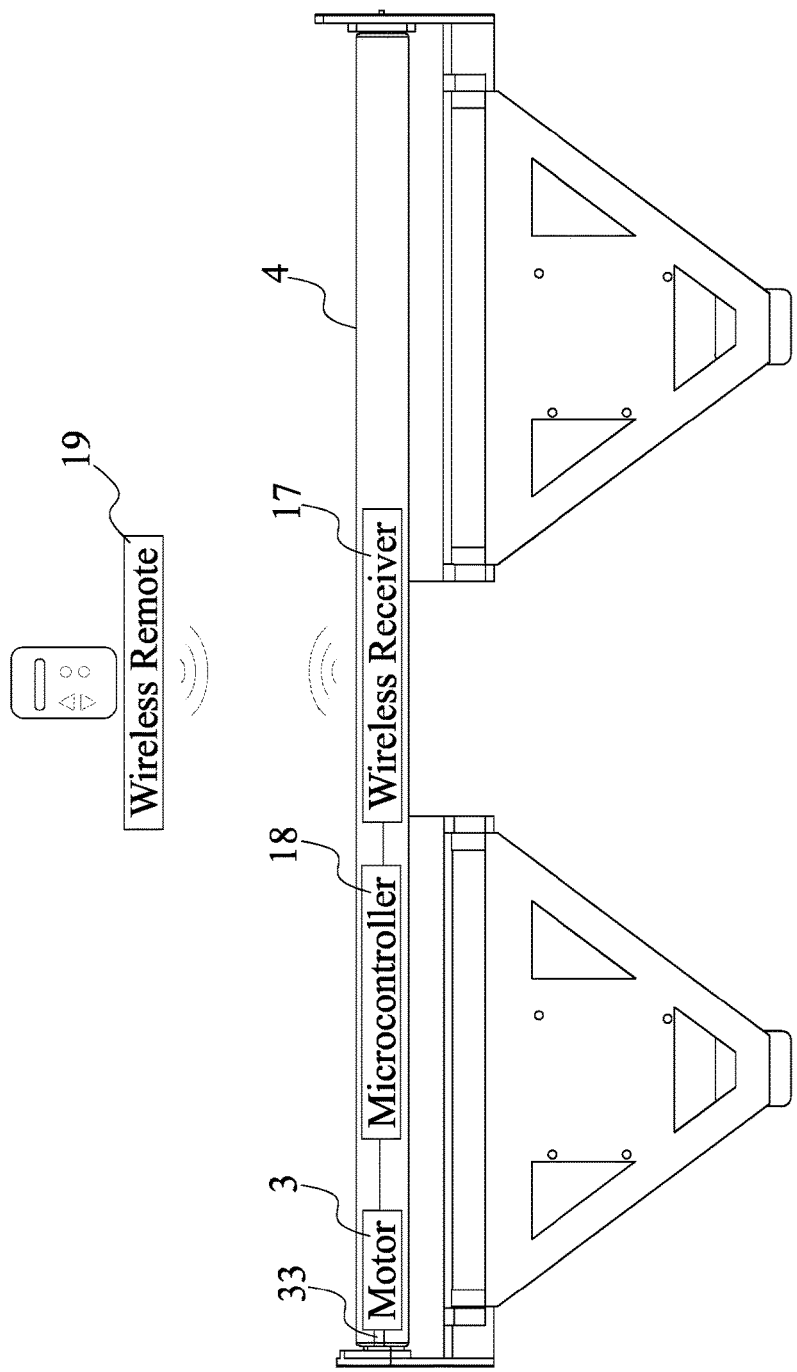
FIG. 11 is a schematic diagram for the electrical components of the present invention.

In accordance to FIG. 3 and FIG. 11, the motor 3 is mounted onto the roller-mounting panel 25 of the first mounting bracket 1. The roller 4 is rotatably coupled to the roller-mounting panel 25 of the first mounting bracket 1 through the motor 3. The roller 4 is rotatably coupled to the roller-mounting panel 25 of the second mounting bracket 2. This configuration allows the roller 4 to revolve on a central axis of the roller 4 between the first mounting bracket 1 and the second mounting bracket 2 through the actuation of the motor 3. The aesthetic sheet 5 is adjacently connected along the roller 4 to spool and unspool around the roller 4 as the motor 3 rotates the roller 4, in order to extend or retract the aesthetic sheet 5. The aesthetic sheet 5 may be fastened to the roller 4 through snap buttons, hook and loop fasteners, or adhesives. In some embodiments of the present invention, the present invention comprises a sheet receiving groove 6. The sheet receiving groove 6 laterally traverses into the roller 4. The aesthetic sheet 5 is slotted into the sheet receiving groove 6, shown in FIG. 10, to secure the aesthetic sheet 5 along the roller 4, while allowing the aesthetic sheet 5 to be easily removable to install or interchange the aesthetic sheet 5 with another according to the user's preference.

More specifically, the roller 4 comprises a roller shaft 29, a first mounting end 30, and a second mounting end 31, detailed in FIG. 3. The roller shaft 29 is rotatably connected to the first mounting end 30 and the roller shaft 29 is rotatably connected to the second mounting end 31. The first mounting end 30 is oppositely positioned to the second mounting end 31 along the roller shaft 29. The first mounting end 30 is coupled with the roller-mounting panel 25 of the first mounting bracket 1. The second mounting end 31 is coupled with the roller-mounting panel 25 of the first mounting bracket 1. This configuration allows the roller shaft 29 to rotate on a central axis while being fixed between the first mounting bracket 1 and the second mounting bracket 2.

Figure 6:
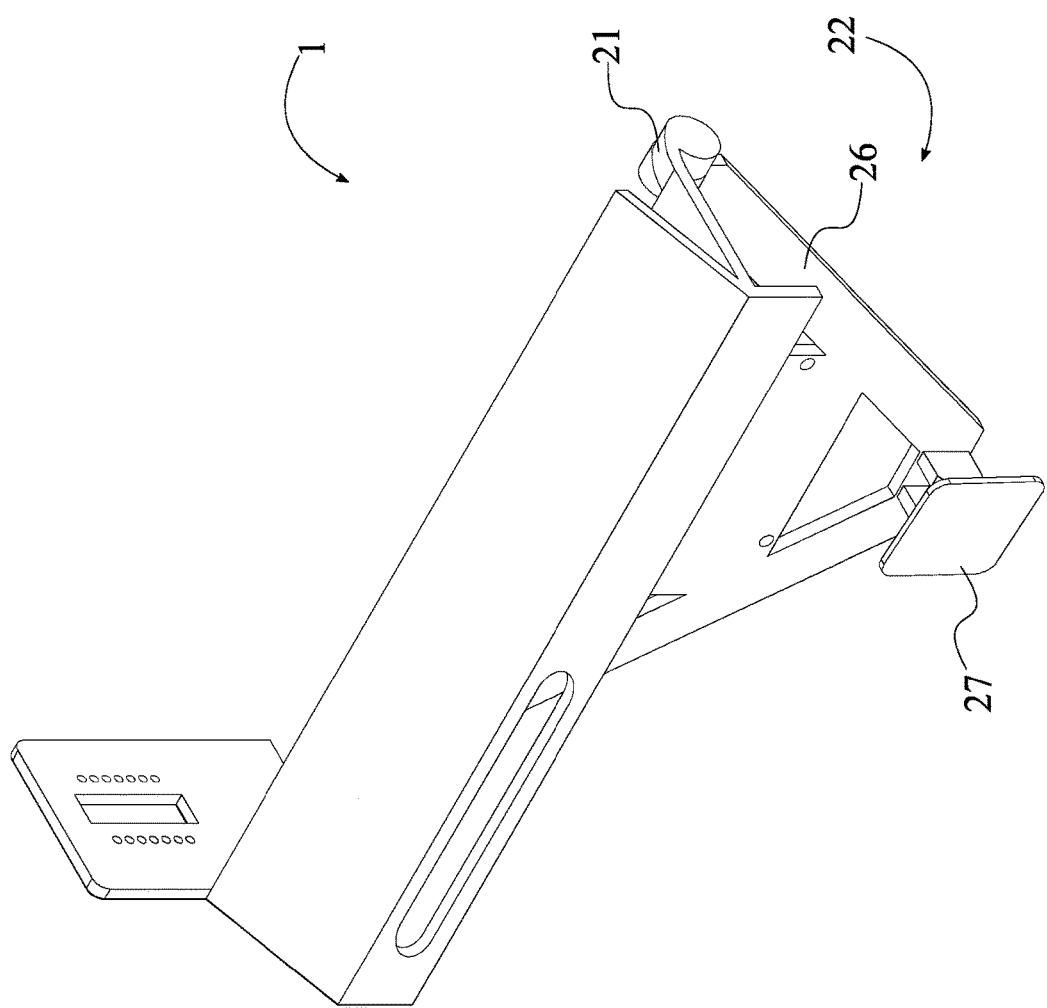
FIG. 6 is a perspective view for a first mounting bracket of the present invention.
Figure 7:
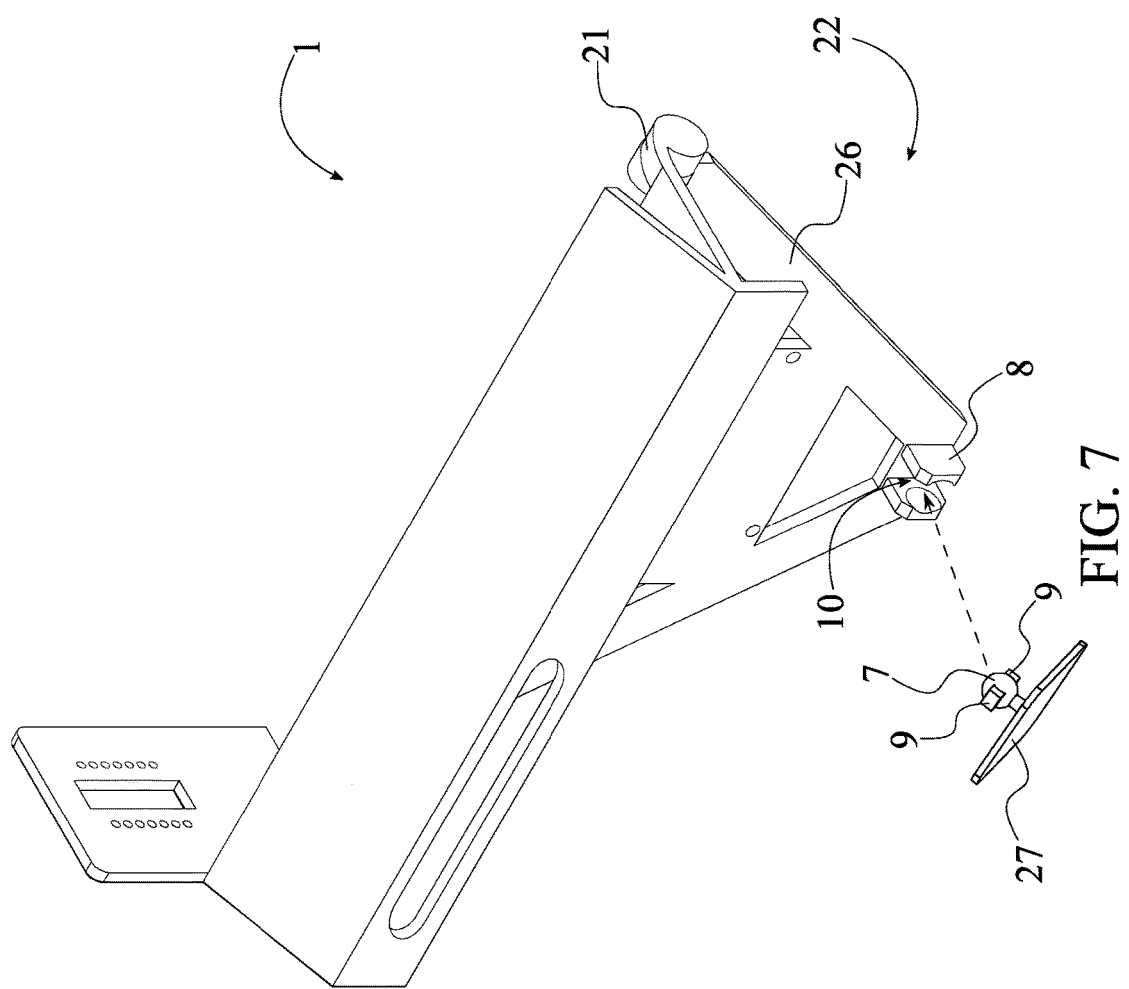
FIG. 7 is a perspective view for a first mounting bracket of the present invention, wherein rear-supporting panel is exploded.

Further in accordance to the preferred embodiment of the present invention, the rear-mounting support 22 comprises a support panel 26 and an angular compensation support 27 to accommodate the rear of the frame for television sets with irregular geometries, detailed in FIG. 6 and FIG. 7. The support panel 26 is hingedly connected to the top-mounting support 21 to allow the rear-mounting support 22 to conform to the irregular geometry. The support panel 26 is offset from the frame of the television set through the angular compensation support 27. The angular compensation support 27 is pivotably mounted to the support panel 26 to further conform to the frame of the television set. The angular compensation support 27 is oppositely positioned to the top-mounting support 21 to effectively distribute the weight of the present invention onto the television frame. The angular compensation support 27 is oriented towards the front-mounting support 28 such that the angular compensation support 27 is oriented towards the frame during implementation of the present invention to interface with the frame. The angular compensation support 27 may be affixed to the television set through hook and loop fasteners, adhesives, or any other appropriate fastener to prevent the present invention from being dislodged from the frame. More specifically, the present invention comprises a ball connector 7 and a socket support 8 to provide the pivoting connection between the support panel 26 and the angular compensation support 27, shown in FIG. 7. The ball connector 7 is adjacently connected to the angular compensation support 27. The socket support 8 is adjacently connected to the support panel 26. The socket support 8 is oppositely positioned to the top-mounting support 21 across the support panel 26. The ball connector 7 engages the socket support 8 to allow the angular compensation support 27 to pivot on to support panel 26.

In some embodiments of the present invention, the present invention comprises a pair of rotation-restriction extrusions 9 and a rotation-restriction channel 10 to limit the range of motion of the angular compensation support 27, detailed in FIG. 7. The pair of rotation-restriction extrusions 9 is adjacently connected to the ball connector 7. The pair of rotation-restriction extrusions 9 is diametrically opposed to each other about the ball connector 7. The rotation-restriction channel 10 traverses through the socket support 8. The rotation-restriction channel 10 is oriented perpendicular to the top-mounting support 21. The pair of rotation-restriction extrusions 9 is positioned within the rotation-restriction channel 10 to restrict the angular compensation support 27 to pivot towards and away from the top-mounting support 21.

Figure 8:
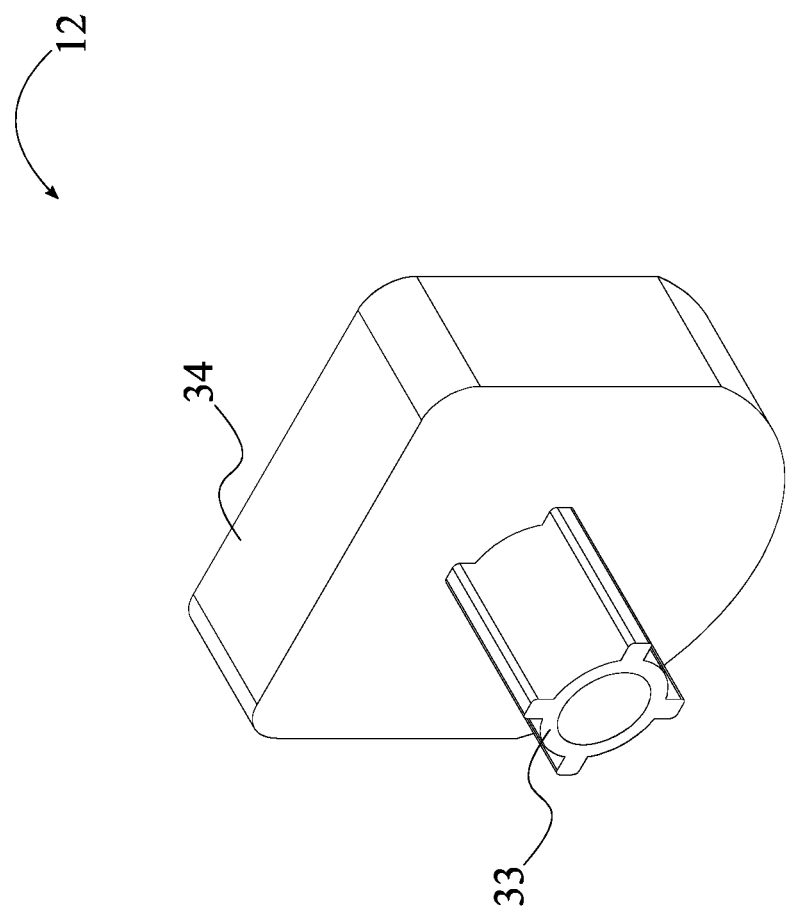
FIG. 8 is a perspective view for a motor adapter of the present invention.

In accordance to an alternate embodiment for the first mounting bracket 1, the present invention comprises a motor adapter 12 and a motor-support extrusion 13, illustrated in FIG. 3. The motor-support extrusion 13 supports the motor adapter 12 on the roller-mounting panel 25. The motor-support extrusion 13 is adjacently connected to the roller-mounting panel 25, shown in FIG. 3 and FIG. 5. The motor-support extrusion 13 is oriented towards the top-mounting support 21. The motor adapter 12 secures the motor 3 to the motor-support extrusion 13 to allow the motor 3 to rotate the roller 4 effectively. The motor adapter 12 comprises a motor-engaging extrusion 33 and a support-engaging base 34, in accordance to FIG. 8. The motor-engaging extrusion 33 is perpendicularly connected to the support-engaging base 34. The motor-engaging extrusion 33 engages the motor 3 and the support-engaging base 34 is slotted into the motor 3 support extrusion to allow the user to easily insert and remove the roller 4 from the first mounting bracket 1 and the second mounting bracket 2. In this configuration, the motor 3 is secured to the roller-mounting panel 25 through the motor-engaging extrusion 33 and the support-engaging base 34. The motor-support extrusion 13 prevents the rotation of the motor 3, such that the motor 3 is able to rotate the roller 4 effectively.

Figure 9:
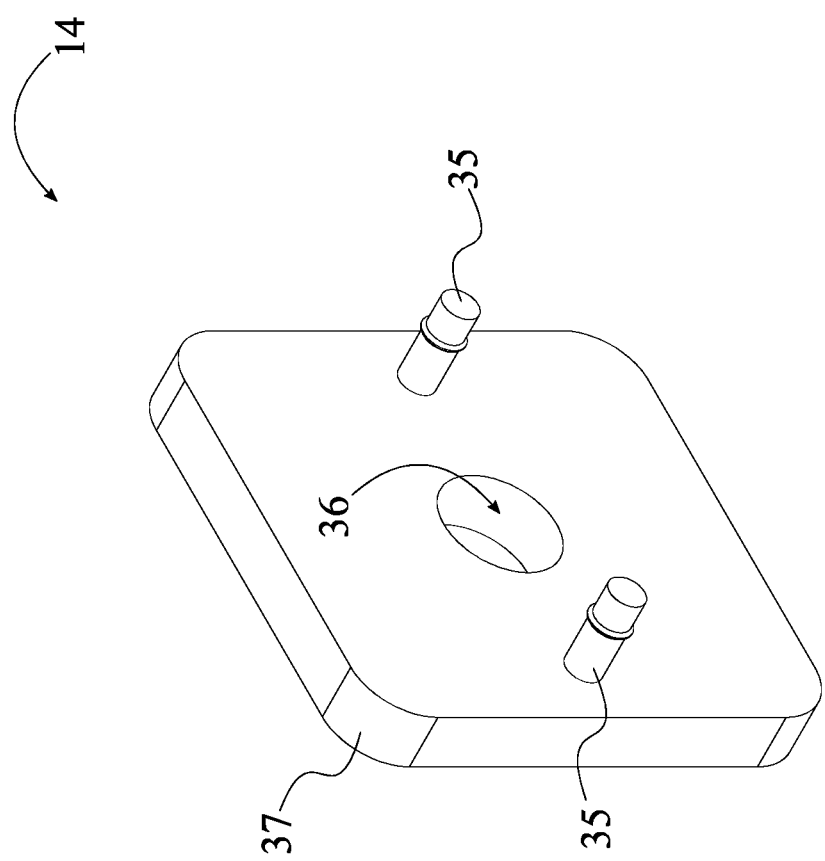
FIG. 9 is a perspective view for a leveling bracket of the present invention.

In accordance to an alternate embodiment for the second mounting bracket 2, the present invention comprises a leveling bracket 14, a plurality of leveling holes 16, and a roller-access slot 15. The leveling bracket 14 allows the user to adjust the height difference between the first mounting end 30 and the second mounting end 31 when the roller 4 is positioned between the first mounting bracket 1 and the second mounting bracket 2. The plurality of leveling holes 16 allows the user to make discrete adjustments for the height of second mounting with respect to the first mounting end 30. The plurality of leveling holes 16 traverse through the roller-mounting panel 25. The roller-access slot 15 provides the user with access to the second mounting end 31 through the second mounting bracket 2. The roller-access slot 15 traverses through the roller-mounting panel 25, shown in FIG. 4. The leveling bracket 14 comprises a pair of leveling pins 35, a roller-receiving hole 36 and a bracket plate 37, detailed in FIG. 3 and FIG. 9. The pair of leveling pins 35 secure the bracket plate 37 to the roller-mounting panel 25. The roller-receiving hole 36 traverses through the bracket plate 37. The roller 4 is rotatably engaged with the roller-receiving hole 36 to allow the roller 4 to rotate on the central axis of the roller 4. The pair of leveling pins 35 is perpendicularly connected to the bracket plate 37. Each of the pair of leveling pins 35 engages a corresponding leveling hole of the plurality of leveling holes 16 to secure the leveling bracket 14 to the roller-mounting panel 25, shown in FIG. 3. The pair of leveling pins 35 is preferred to be diametrically opposed to each other about the roller-receiving hole 36 to evenly support the leveling bracket 14 onto the roller-mounting panel 25. In accordance to FIG. 4, the roller-access slot 15 slot is positioned between a first set of leveling holes 38 from the plurality of leveling holes 16 and a second set of leveling holes 39 from the plurality of leveling holes 16 Therefore, the roller 4 is accessible to the user through the roller-access slot 15 as the pair of leveling pins 35 engage the corresponding leveling holes. More specifically, the roller 4 comprises a roller shaft 29 and a spring-loaded button latch 32. The spring-loaded button latch 32 is centrally, and terminally connected to the roller shaft 29. The spring-loaded button latch 32 engages the roller-receiving hole 36 to secure the roller 4 onto the leveling bracket 14. Therefore, the user is able to depress the spring-loaded button latch 32 through the roller-access slot 15 slot to quickly remove the roller 4 from the leveling bracket 14.

In some embodiments of the present invention, the present invention comprises a wireless receiver 17, a microcontroller 18, and a wireless remote 19 to allow the user to remotely control the extension and retraction of the aesthetic sheet 5. Illustrated in FIG. 11, the wireless receiver 17 is mounted within the roller 4 to protect the wireless transceiver from damage. Similarly, the microcontroller 18 is internally mounted to the roller 4. The wireless receiver 17 is electronically connected to the motor 3 through the microcontroller 18, such that the microcontroller 18 translates signals received from the wireless controller 4 into control signals to manipulate the motor 3. The wireless remote 19 allows the user to operate the present invention from a distance. The wireless remote 19 is communicatively coupled to the wireless receiver 17 to transmit the input signal from the user to the wireless receiver 17. The wireless remote 19 may utilize wireless protocols that include, but are not limited to, radio frequency, Bluetooth, Wi-Fi, or similarly appropriate wireless protocols.

Although the invention has been explained in relation to its preferred embodiment, it is to be understood that many other possible modifications and variations can be made without departing from the spirit and scope of the invention as hereinafter claimed.

What is claimed is:

1. A motorized roller television cover assembly comprising:
    a first mounting bracket and a second mounting bracket each comprising a front-mounting support, a sheet support, a top-mounting support, a rear-mounting support, and a roller-mounting panel;
    the rear-mounting support being hingedly connected to the top-mounting support;
    the roller-mounting panel being connected to the top-mounting support;
    the roller-mounting panel of the first mounting bracket being oppositely positioned to the roller-mounting panel of the second mounting bracket along each top-mounting support;
    a motor being mounted onto the roller-mounting panel of the first mounting bracket;
    a roller being rotatably coupled to the roller-mounting panel of the first mounting bracket through the motor;
    the roller being rotatably coupled to the roller-mounting panel of the second mounting bracket;
    an aesthetic sheet being adjacently connected along the roller;
    the front-mounting support being perpendicularly connected along the top-mounting support;
    the front-mounting support being oppositely positioned to the rear-mounting support across the top-mounting support;
    the sheet support being adjacently positioned to the front-mounting support;
    the sheet support being oriented away from the front-mounting support;
    the sheet support being connected to the top-mounting support, opposite to the rear-mounting support across the top-mounting support; and
    the roller-mounting panel being connected to the sheet support.

2. The motorized roller television cover assembly, as claimed in claim 1, comprising:
the sheet support being at an acute angle with the top-mounting support.

3. The motorized roller television cover assembly, as claimed in claim 1, comprising:
the roller comprising a roller shaft, a first mounting end, and a second mount end;
the roller shaft being rotatably connected to the first mounting end;
the roller shaft being rotatably connected to the second mounting end;
the first mounting end being oppositely positioned to the second mounting end, along the roller shaft;
the first mounting end being coupled with the roller-mounting panel of the first mounting bracket; and
the second mounting end being coupled with the roller-mounting panel of the second mounting bracket.

4. The motorized roller television cover assembly, as claimed in claim 1, comprising:
a sheet receiving groove laterally traversing into the roller; and
the aesthetic sheet being slotted into to the sheet receiving groove.

5. The motorized roller television cover assembly, as claimed in claim 1, comprising:
the rear-mounting support comprising a support panel and an angular compensation support;
the support panel being hingedly connected to the top-mounting support; and
the angular compensation support being pivotably mounted to the support panel.

6. The motorized roller television cover assembly, as claimed in claim 5, comprising:
the first mounting bracket and the second mounting bracket each further comprising a front-mounting support; and
the angular compensation support being oriented towards the front-mounting support.

7. The motorized roller television cover assembly, as claimed in claim 5, comprising:
a ball connector being adjacently connected to the angular compensation support;
a socket support being adjacently connected to the support panel;
the socket support being oppositely positioned to the top-mounting support across the support panel; and
the ball connector engaging the socket support.

8. The motorized roller television cover assembly, as claimed in claim 7, comprising:
a pair of rotation-restriction extrusions being adjacently connected to the ball connector;
the pair of rotation-restriction extrusions being diametrically opposed to each other about the ball connector;
a rotation-restriction channel traversing through the socket support; and
the pair of rotation-restriction extrusions being positioned within the rotation-restriction channel.

9. The motorized roller television cover assembly, as claimed in claim 1, comprising:
a motor adapter comprising a motor-engaging extrusion and a support-engaging base;
a motor-support extrusion being connected to the roller-mounting panel;
the motor-support extrusion being oriented towards the top-mounting support;
the motor-engaging extrusion being perpendicularly connected to the support-engaging base;
the motor-engaging extrusion engaging the motor; and
the support-engaging base being connected to the motor-support extrusion.

10. The motorized roller television cover assembly, as claimed in claim 1, comprising:
a leveling bracket comprising a pair of leveling pins, a roller-receiving hole, and a bracket plate;
a roller-access slot traversing through the roller-mounting panel;
a plurality of leveling holes traversing through the roller-mounting panel;
the roller-receiving hole traversing through the bracket plate;
the pair of leveling pins being perpendicularly connected to the bracket plate;
each of the pair of leveling pins engaging a corresponding leveling hole of the plurality of leveling holes; and
the roller being rotatably engaged with the roller-receiving hole.

11. The motorized roller television cover assembly, as claimed in claim 10, comprising:
the pair of leveling pins being diametrically opposed to each other about the roller-receiving hole.

12. The motorized roller television cover assembly, as claimed in claim 10, comprising:
the roller-access slot being positioned between a first set of leveling holes from the plurality of leveling holes and a second set of leveling holes from the plurality of leveling holes.

13. The motorized roller television cover assembly, as claimed in claim 10, comprising:
the roller comprising a roller shaft and a spring-loaded button latch;
the spring-loaded button latch being centrally and terminally connected to the roller shaft; and
the spring-loaded button latch engaging the roller-receiving hole.

14. The motorized roller television cover assembly, as claimed in claim 1, comprising:
a wireless receiver being internally mounted to the roller;
a microcontroller being internally mounted to the roller; and
the wireless receiver being electronically connected to the motor through the microcontroller.

15. The motorized roller television cover assembly, as claimed in claim 1, comprising:
a wireless remote being communicatively coupled with the wireless receiver.

16. The motorized roller television cover assembly, as claimed in claim 1, comprising:
the first mounting bracket and the second mounting bracket each further comprising a fastener; and
the fastener being affixed across the rear mounting support.

* * * * *